United States Patent [19]
Ikeda et al.

[11] Patent Number: 5,174,793
[45] Date of Patent: Dec. 29, 1992

[54] METHOD OF ENHANCING PLANT GROWTH USING LIGHT LEVELS LOWER THAN PHOTO SATURATION INTENSITY

[75] Inventors: Akira Ikeda; Shigeki Nakayama; Kenji Ezaki; Toshitsugu Ishii, all of Hyogo, Japan

[73] Assignee: Mitsubishi Denki K.K., Tokyo, Japan

[21] Appl. No.: 266,610

[22] Filed: Dec. 23, 1988

Related U.S. Application Data

[63] Continuation of Ser. No. 665,212, Oct. 26, 1984, Pat. No. 4,817,332.

[30] Foreign Application Priority Data

Oct. 28, 1983 [JP] Japan .............................. 58-203308
Oct. 28, 1983 [JP] Japan .............................. 58-203309

[51] Int. Cl.⁵ .......................... A01G 9/18; A01G 9/20
[52] U.S. Cl. ............................................ 47/58; 47/17; 47/DIG. 6
[58] Field of Search ............... 47/17, DIG. 6, 58, 82, 47/39, 60

[56] References Cited

U.S. PATENT DOCUMENTS

| | | | |
|---|---|---|---|
| 3,529,379 | 9/1970 | Ware | 47/17 |
| 3,673,733 | 7/1972 | Allen | 47/17 X |
| 3,931,695 | 1/1976 | Widmayer | 47/59 X |
| 4,003,160 | 1/1977 | Müller | 47/17 X |
| 4,091,566 | 5/1978 | Horvath et al. | 47/DIG. 6 X |
| 4,250,666 | 2/1981 | Rakestraw | 47/DIG. 6 X |
| 4,255,897 | 3/1981 | Ruthner | 47/DIG. 6 X |
| 4,543,744 | 10/1985 | Royster | 47/17 |
| 4,662,106 | 5/1987 | Mori | 47/17 |

OTHER PUBLICATIONS

"Influence of Light on Plant Growth" by Sidney Wasman and J. P. Nitsch from American Nurseryman Nov. 15, 1956 pp. 11-12.

Fredericg H. article from U.S.D.A. Agricultural Research Service, Beltsville, Maryland reprinted from Plant Physiology vol. 39, No. 5, Sep. 1964 pp. 812-816.

"Preliminary Study of Light Intensity" by Robert Casamajor from American Orchid Society Bulletin vol. 20, No. 2, Feb. 1, 1951 pp. 69-71.

Salvania Lighting Products, Fluorescent Lamps Bulletin O-262 Issued by the commercial Engineering Dept., Salem., Mass.

"Lighting for Plant Growth" by Bickford/Denn, The Kent State Univ. Press, pp. 64-67, 1972 Light-Intensity and Wavelength.

*Primary Examiner*—Danton D. DeMille
*Attorney, Agent, or Firm*—Sughrue, Mion, Zinn, Macpeak & Seas

[57] ABSTRACT

A method of plant cultivaton and growth acceleration includes enclosing the plants within a reflective chamber, controlling the $CO_2$ concentration within said chamber so as to be at least 200 ppm, and irradiating the plants substantially omnidirectionally with a light intensity of approximately 3000 lux, while stably regulating the ambient temperature, relative humidity and nutrient supply.

7 Claims, 3 Drawing Sheets

METHOD OF ENHANCING PLANT GROWTH USING LIGHT LEVELS LOWER THAN PHOTO SATURATION INTENSITY

This is a continuation of application Ser. No. 06/665,212 filed Oct. 26, 1984 now U.S. Pat. No. 4,817,332.

BACKGROUND OF THE INVENTION

The present invention relates to a method of enhancing plant growth under artificial environmental conditions such as light intensity and $CO_2$ concentration, and to an apparatus for performing such a method.

Various systems or methods of enhancing plant growth by controlling environmental conditions to thereby makes possible the industrial production of plants have been proposed.

In general, a plant produces organic substances in its leaves on the basis of the supplied water and carbon dioxide with the aid of light energy. A portion of the products are consumed by the plant to provide the energy necessary to maintain itself, and the remainder is delivered to and stored in its organs such as root and leaves, resulting in growth. It has been known that the growth of a given plant can be remarkably enhanced by controlling parameters such as light intensity, $CO_2$ concentration and temperature etc. Therefore, land productivity may be improved and the factory production of plants becomes possible.

In the case of factory agricultural production, the utilization of solar energy might seem to be most efficient method in view of energy economy. However, since the amount of solar light depends upon seasonal conditions as well as weather conditions including temperature and humidity, plant behavior under such varying environmental conditions is very complicated, resulting in difficulties in planning plant production. Furthermore, in order to make environmental conditions other than light constant, a huge air-conditioning facility may be required, resulting in economical disadvantages.

In order to make periodic plant production realizable, it has been proposed to use, instead of solar energy, an artificial light source of a constant intensity. In this case, however, the required power becomes so large as to make such a plan impossible in view of economy, although other environmental conditions may be controlled relatively easily.

SUMMARY OF THE INVENTION

An object of the present invention is to provide a method of enhancing plant growth using a relatively low intensity artificial light.

According to the present invention, the above object is achieved by irradiating the plants peripherally with light having an intensity lower than the saturation intensity when irradiation is performed vertically.

DETAILED DESCRIPTION OF THE PREFERRED EMBODIMENTS

Figure 1:
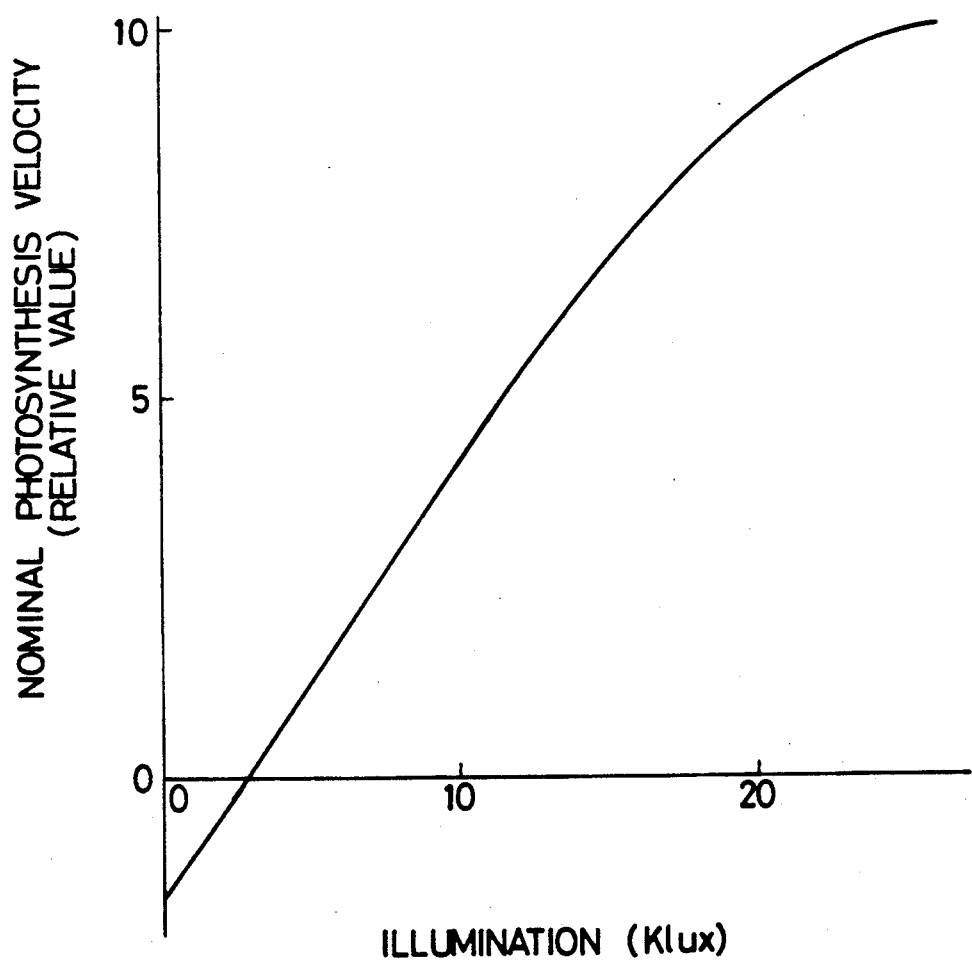
FIG. 1 shows the relation between light intensity and the rate of plant photosynthesis.

As an effective method of enhancing plant growth, it has been known to increase the light irradiation. FIG. 1 is a graph showing the relation between light intensity (K lux) and the nominal photosynthesis velocity (relative value), which can be used as an index of the growth velocity, of, for example, salad greens, when irradiated vertically under conditions of 12 hours of sunshine per day, a temperature of 20° C., 80% relative humidity and a $CO_2$ concentration of 1200 ppm. As is clear from FIG. 1, there is, for a given plant, a limit, i.e. a photo-saturation point above which there is no further increase in the photosynthesis velocity. Therefore, in order to enhance plant growth it may be considered that the plant should be irradiated with light having an intensity around the limit. When salad greens are irradiated with vertical light, the limit, i.e., photo-saturation, is around 20K lux as shown in FIG. 1. For example, the yield increases by about a factor of 20 within 10 days, when the plants are irradiated vertically under the conditions of light intensity=20K lux, sunshine per day=24 hours, with the other conditions being the same as those used to obtain the graph in FIG. 1.

The number of leaves and the size of each leaf of the plant increase with the growth thereof, and grouped leaves are obtained. When the plant is irradiated vertically as in the conventional manner, the light intensity received by the lower leaves of a given group is much lower than that received by the upper leaves of the same group due to the high absorption ratio of the leaves, which may be in the range of 80≅90%. Therefore, the lowermost leaf of the group will have substantially reduced photo-synthesis and may die. In view of this tendency, vertical irradiation is disadvantageous in the effective utilization of photoenergy. In order to resolve this problem, it may be effective to irradiate the plants in both vertical directions, i.e., downwardly as well as upwardly. However, upward irradiation is very difficult in practice.

Figure 2:
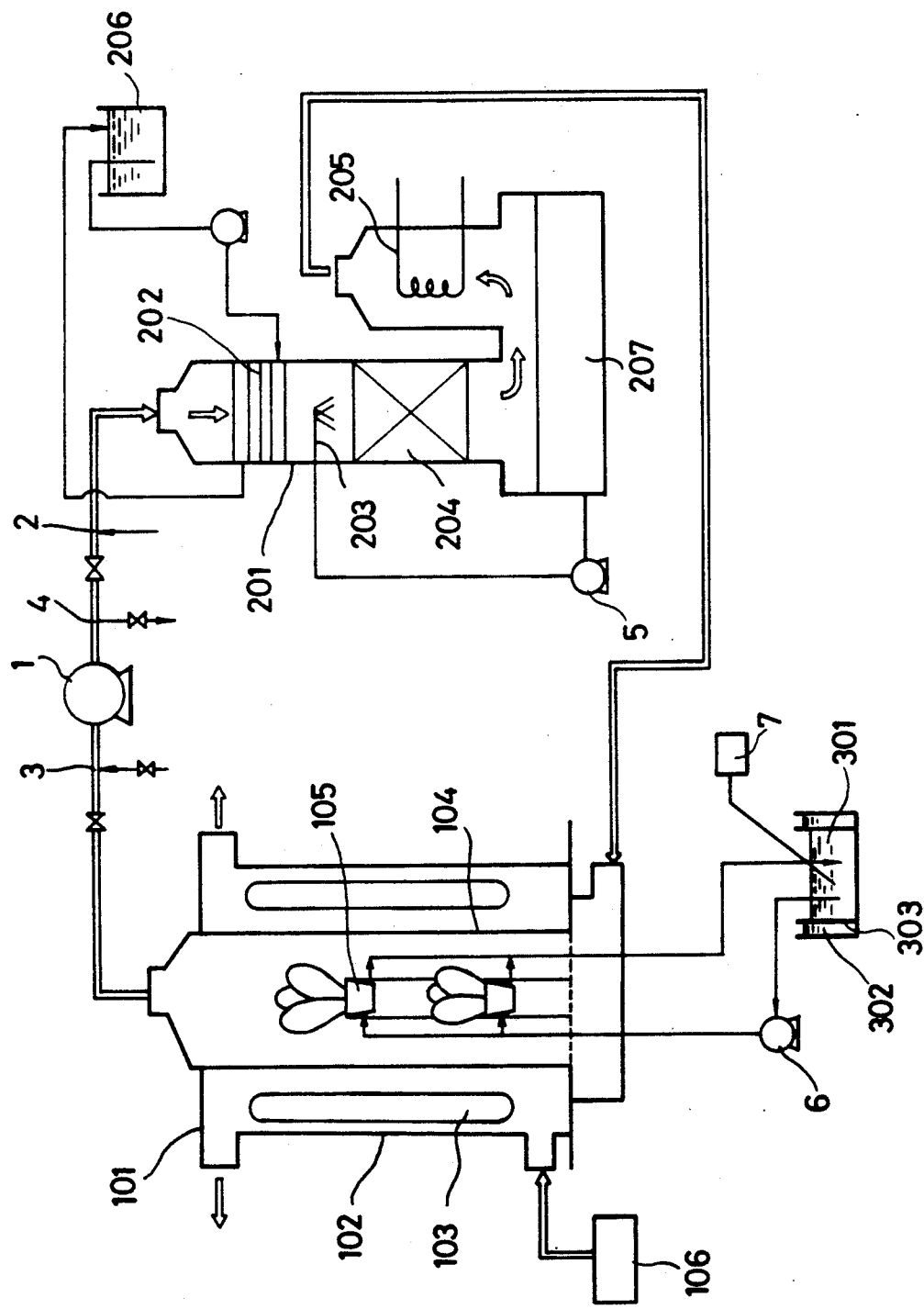
FIG. 2 illustrates the construction of an apparatus for performing the present invention.

FIG. 2 shows, schematically, the construction of a plant growing apparatus for use in performing the present invention. In FIG. 2, reference numeral 101 represents the outer cylindrical chamber of a generally cylindrical plant growing chamber. The inner surface of outer wall 102 of the outer chamber 101 is formed of a reflective material such as aluminum, and artificial light sources 103 are disposed within the outer chamber 101 so that light from these sources is effectively directed radially inwardly of the plant growing chamber.

Reference numeral 104 represents an inner cylinder of glass and forms, together with the outer cylinder 101, the plant growing chamber. The plants to be grown are respectively implanted in cultivation pots 105. The cultivation pots 105 are vertically disposed in the inner chamber 104 so that the plants can be peripherally irradiated with light from artificial light sources 103.

With this construction, it has been found that uniform omnidirectional light irradiation is established within the inner cylindrical chamber 104 except for at upper and lower portions thereof.

Heat generated by the light sources 103 is removed by heat exchange, using cold air from a cooler 106.

Air to be supplied to the inner chamber 104 is preliminarily regulated in temperature and humidity by an air conditioner 201, and the air is then introduced into the lower portion of the inner cylinder chamber 104, and is returned through an upper portion thereof to the air-conditioner by a blower 1. $CO_2$ is supplied by a $CO_2$ generator, e.g., a $CO_2$ bomb (not shown) connected to a $CO_2$ injection port 2 provided in the air circulation path including the air conditioner 201 and the blower 1. The supply of $CO_2$ is regulated such that the $CO_2$ concentration in the circulating air is maintained at a desired value.

A fresh air intake port 3 and an air discharge port 4 are provided to refresh a portion of the circulating air.

The air-conditioner 201 is constituted of a cooler 202, a water spraying portion including a spray nozzle 203 and a filler layer 204 and a heater 205. Air incoming to the air-conditioner 201 is cooled by a cooler 202 having a cold brine device 206. At the same time, water is supplied by a pump 5 from a water tank 207 to the spray nozzle 203 and then to the filler layer 204 in which water is added to the cooled air. Cooled air having the desired humidity is then heated by the heater 205 to the desired temperature.

On the other hand, a solution 301 of nutrient salts of a predetermined concentration, the temperature of which is maintained at a predetermined value by a constant temperature bath 302, is supplied by a pump 6 to the cultivation pots 105, and the excess is then returned to a tank 303. The solution 301 is atomized by an air pump 7 so that the solution contains sufficient oxygen.

Figure 3:
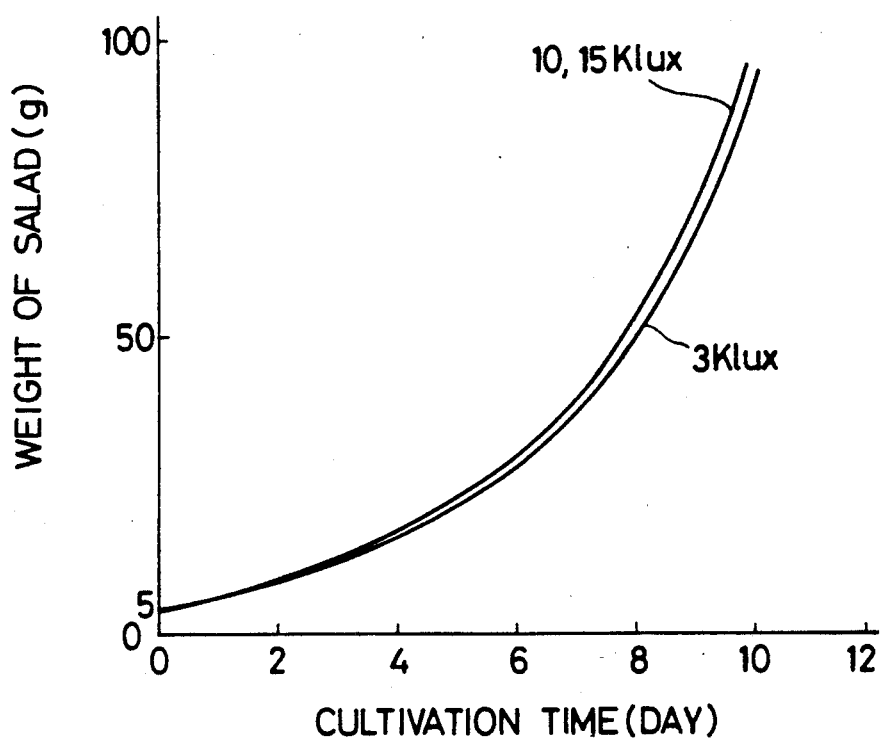
FIG. 3 shows the relation between the plant yield and the number of cultivation days, with light intensity being a parameter.

FIG. 3 shows the relation between the weight (in grams) of salad yield and the number of cultivation days, with the light intensity being varied from 3K lux to 15K lux. This relation was obtained by using the apparatus shown in FIG. 2, under the conditions of a $CO_2$ concentration of 1200 ppm, a temperature of 20° C., a nutrient salt solution temperature of 21° C., 80% relative humidity, a wind velocity of 0.5 m/sec of or lower, a nutrient salt solution concentration of 1.2 millimols, a pH of 5–6.5 and 24 hours of illumination per day. Both fluorescent lamps and incandescent lamps were used for the artificial light source 103.

As is clear from FIG. 3, the growing speed of the plants irradiated with light of 3K lux was substantially the same as that irradiated at 15K lux, resulting in yields of about 20 times the original weight after ten days, respectively.

Therefore, according to the present method, it is possible to obtain acceptable plant growth even at a low light intensity of 3K lux, which is about 1/7 the photo saturation intensity of 20K lux for conventional vertical irradiation. Thus, the economic (energy consumption) problem, which was the most important hindrance to factory production, can be resolved by the present invention and thus an annual plant production plan becomes practically possible.

In the experiment which obtained the results shown in FIG. 3, the $CO_2$ concentration was 1200 ppm, which is about 4 times the atmospheric concentration. Such a high concentration was selected due to the fact that in conventional vertical irradiation, when the concentration of $CO_2$ is in a low range from 200 ppm to 400 ppm, it is impossible to obtain sufficient growth even if the light intensity is increased. That is, the higher the $CO_2$ concentration, the higher the speed of $CO_2$ flow into the plant.

However, such a high concentration of $CO_2$ in a plant cultivating factory is detrimental to the health of the persons who work therein. Therefore, periodic ventilation is necessary, which causes a loss of $CO_2$.

Figure 4:
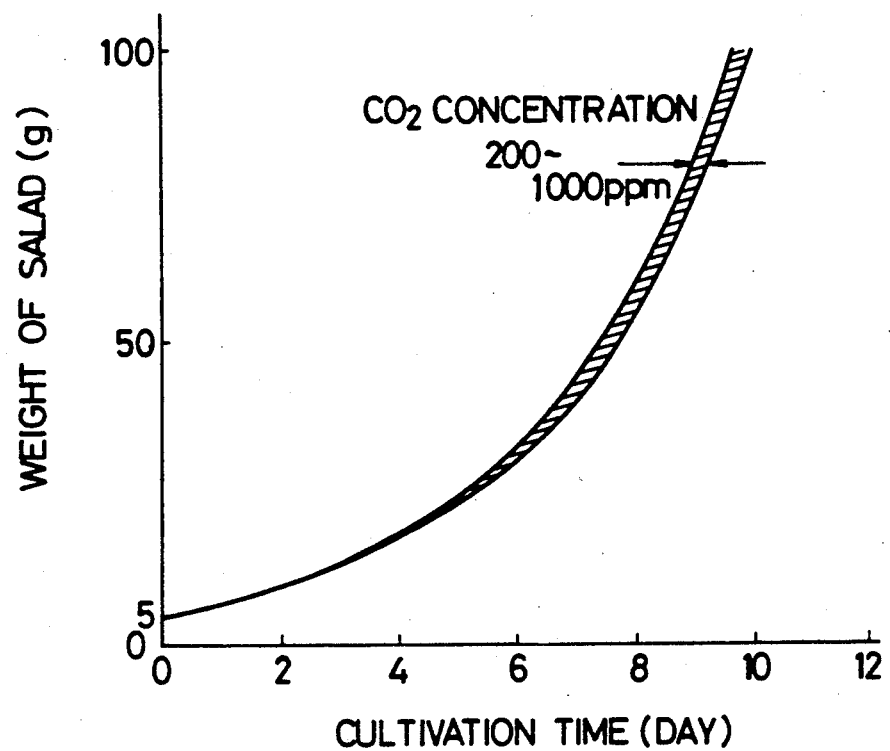
FIG. 4 shows the same relation as FIG. 3, with $CO_2$ concentration being a parameter.

FIG. 4 is a graph showing the relation between the weight (yield in grams) of salad plants and the number of cultivation days, obtained using the apparatus shown in FIG. 2 under conditions of a light intensity of 15K lux, a temperature of 20° C., a nutrient salt solution of 1.2 millimoles, a water pH of $5 \cong 6.5$, a wind velocity of 0.5 m/sec or lower, a sunshine length per day of 24 hours, a $CO_2$ concentration varying from 200 ppm to 4000 ppm, a nutrient salt solution temperature of 21° C. and a relative humidity of 80%. Other conditions were the same as those used to obtain the graph shown in FIG. 3.

As is clear from FIG. 4, there is no substantial difference in the effect of the $CO_2$ concentration on the growing speed of the salad plants so long as the same is in the range of 200 ppm to 4000 ppm. Therefore, it is possible to obtain a satisfactory result even if the $CO_2$ concentration is as low as the atmospheric $CO_2$ concentration. Thus, air can be used directly without regulating the $CO_2$ concentration, allowing the $CO_2$ generator 106 to be omitted or at least minimized.

As mentioned hereinbefore, according to the present invention, the growing speed of the plants can effectively enhanced by irradiating the same peripherally with light having an intensity which is at least one-seventh the photo-saturation value in the case where the same are irradiated using only downwardly directed light.

It should be noted that the term "peripheral" as used in this specification is intended to indicate omnidirectional, except for the upward direction.

Although the plant cultivating chambers 101, 104 are constructed as cylinders, it should be noted that they may be in many other forms such as spherical, rectangular etc.

We claim:

1. A method of enhancing the growing speed of a plant by controlling at least the light intensity and $CO_2$ concentration comprising the steps of:

determining the photo saturation intensity of said plant, comprising a light intensity limit for such plant above which photosynthesis velocity is not increased, maintaining the $CO_2$ concentration at 200–4,000 ppm, and illuminating the plant by directing light to the plant from substantially upper and lower sides of said plant and from all circumferential directions inwardly towards said plant simultaneously and uniformly and controlling said light intensity so as to be lower than said photo saturation intensity with respect to said plant being grown.

2. A method of enhancing the growth speed of a plant having a known photo saturation intensity, comprising a light intensity limit for such plant above which photosynthesis velocity is not increased, by controlling at least the light intensity and $CO_2$ concentration, comprising the steps of maintaining the $CO_2$ concentration at 200–4,000 ppm and illuminating the plant by directing light to the plant from substantially upper and lower sides of said plant and from all circumferential directions inwardly toward said plant simultaneously and uniformly and controlling said light intensity so as to be lower than a photo-saturation intensity with respect to said plant being grown.

3. The method as claimed in claim 2, wherein said illumination of said plant is carried out continuously, 24 hours per day.

4. The method as claimed in claim 2, wherein said light intensity is at least approximately 15K lux.

5. The method as claimed in claim 2, wherein said light intensity is from one-seventh to one-half of said photo-saturation intensity.

6. The method as claimed in claim 5, wherein said $CO_2$ concentration is higher than the $CO_2$ concentration of atmospheric air.

7. The method as claimed in claim 2, wherein a period of said illumination step is longer than 12 hours per day.

* * * * *